United States Patent
Bhogal et al.

(10) Patent No.: US 7,627,816 B2
(45) Date of Patent: Dec. 1, 2009

(54) METHOD FOR PROVIDING A TRANSIENT DICTIONARY THAT TRAVELS WITH AN ORIGINAL ELECTRONIC DOCUMENT

(75) Inventors: Kulvir Singh Bhogal, Fort Worth, TX (US); Alexandre Polozoff, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 11/103,784

(22) Filed: Apr. 12, 2005

(65) Prior Publication Data
US 2006/0230346 A1    Oct. 12, 2006

(51) Int. Cl.
*G06F 17/21* (2006.01)

(52) U.S. Cl. .................. 715/259; 715/255; 715/256; 715/823

(58) Field of Classification Search ................ 715/530, 715/531, 532, 823, 255, 256, 259
See application file for complete search history.

(56) References Cited

U.S. PATENT DOCUMENTS

| | | | | |
|---|---|---|---|---|
| 4,847,766 A * | 7/1989 | McRae et al. | ............... | 715/532 |
| 5,359,514 A * | 10/1994 | Manthuruthil et al. | ........ | 704/10 |
| 5,359,707 A * | 10/1994 | Sato | ............ | 715/532 |
| 5,682,543 A * | 10/1997 | Shiomi | ............ | 715/532 |
| 5,745,776 A * | 4/1998 | Sheppard, II | ............... | 715/532 |
| 5,850,561 A * | 12/1998 | Church et al. | ............... | 715/532 |
| 5,875,443 A * | 2/1999 | Nielsen | ............ | 707/2 |
| 5,970,492 A * | 10/1999 | Nielsen | ............ | 707/10 |
| 6,047,298 A * | 4/2000 | Morishita | ............ | 715/532 |
| 6,047,299 A | 4/2000 | Kaijima | ............ | 707/532 |
| 6,128,635 A | 10/2000 | Ikeno | ............ | 707/532 |
| 6,151,598 A * | 11/2000 | Shaw et al. | ............ | 707/3 |
| 6,282,508 B1 * | 8/2001 | Kimura et al. | ............... | 704/10 |
| 6,345,245 B1 * | 2/2002 | Sugiyama et al. | ............ | 704/10 |
| 6,708,311 B1 * | 3/2004 | Berstis | ............ | 715/533 |
| 6,782,510 B1 * | 8/2004 | Gross et al. | ............... | 715/533 |
| 6,785,869 B1 * | 8/2004 | Berstis | ............ | 715/532 |
| 6,961,722 B1 * | 11/2005 | Bruecken | ............ | 707/3 |

(Continued)

OTHER PUBLICATIONS http://office.microsoft.com/en-us/word/HP051895581033.aspx, Microsoft Word 2003, Create and use custom dictionaries, 3 pages.*

(Continued)

*Primary Examiner*—William L. Bashore
*Assistant Examiner*—Ece Hur
(74) *Attorney, Agent, or Firm*—Stephen J. Walder, Jr.; David A. Mims, Jr.

(57) ABSTRACT

A method for providing a transient electronic dictionary that travels with an original electronic document is provided. An author of an electronic document may generate a transient electronic dictionary that is linked with the original electronic document such that the transient electronic dictionary is transmitted along with the original electronic document when the original electronic document is distributed. At a recipient computer system, when the original electronic document is accessed, the associated transient electronic dictionary is loaded by the word processing application. The loaded transient electronic dictionary is used to expand the permanent electronic dictionary present in the recipient computer system temporarily. The word processing application may then resolve words in the original electronic document using the loaded transient electronic dictionary entries.

10 Claims, 6 Drawing Sheets

U.S. PATENT DOCUMENTS

| | | | |
|---|---|---|---|
| 2002/0143828 A1* | 10/2002 | Montero et al. | 707/533 |
| 2003/0160830 A1* | 8/2003 | DeGross | 345/808 |
| 2004/0148156 A1* | 7/2004 | Hawkins | 704/10 |
| 2006/0095842 A1* | 5/2006 | Lehto | 715/532 |
| 2006/0143564 A1* | 6/2006 | Bates et al. | 715/533 |

OTHER PUBLICATIONS http://office.microsoft.com/en-us/excel/HP051985301033.aspx, Microsoft Excel 2003, Create a custom dictionary, 3 pages.*

* cited by examiner

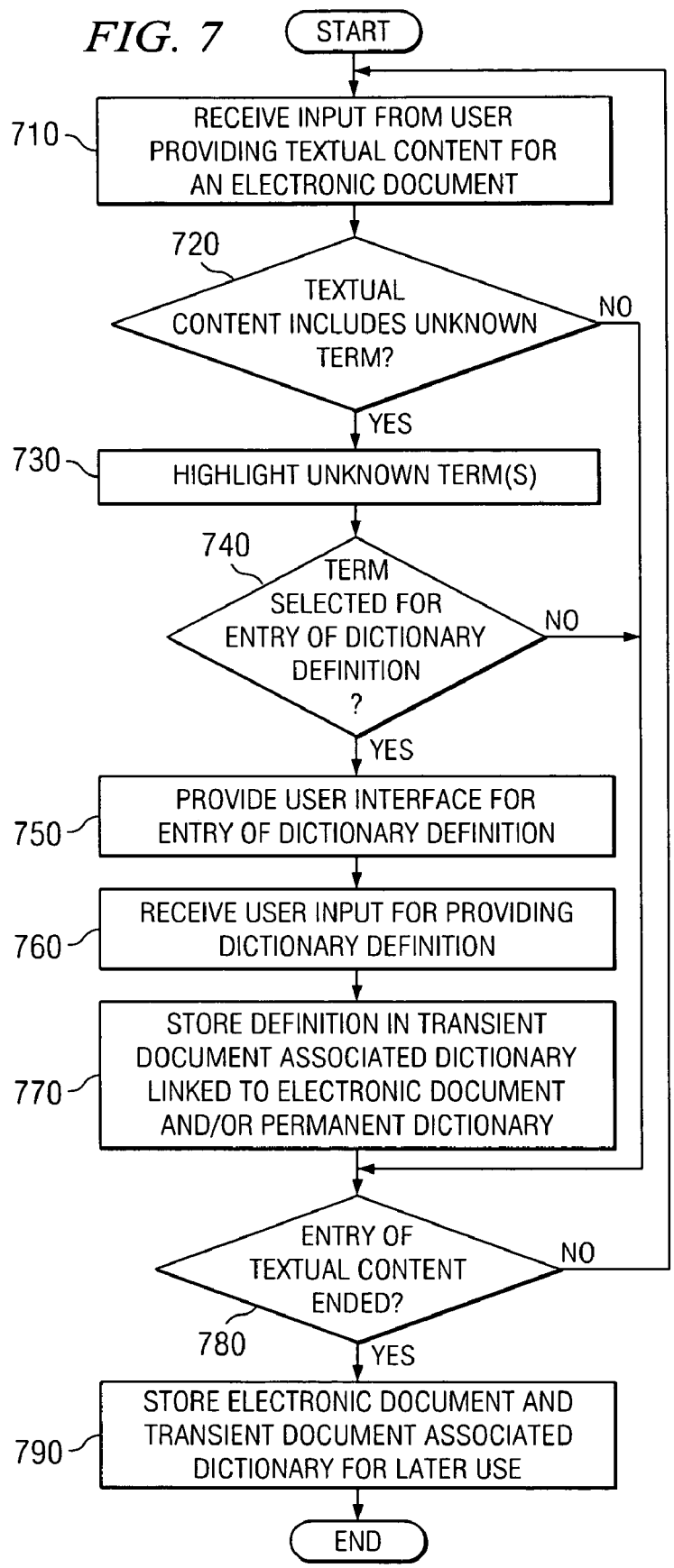

METHOD FOR PROVIDING A TRANSIENT DICTIONARY THAT TRAVELS WITH AN ORIGINAL ELECTRONIC DOCUMENT

BACKGROUND OF THE INVENTION

1. Technical Field

The present invention relates generally to an improved data processing system and method. In particular, the present invention provides a system and method for providing a transient dictionary that travels with an original electronic document.

2. Description of Related Art

When creating a document using a word processing program, such as the Lotus WordPro™ word processing program, available from International Business Machines Corporation, or the Microsoft Word™ word processing program, available from Microsoft Corporation, it is often the case that the user may make use of terms, acronyms, and the like, that may not be known to all potential readers of the document. For example, when generating a technical document, it is often the case that acronyms or terms are used that are specific to a particular project being described in the technical document. Moreover, many terms and acronyms may have multiple different meanings depending upon the context in which they are used, however it may sometimes be difficult to discern the particular meaning from the context.

In order to address this situation, and other situations, such as translation of documents into different languages, electronic or machine-readable dictionaries have been developed for use in providing meaning to these uncommon terms, acronyms, and the like. Electronic dictionaries are widely used in computer systems. There are many kinds of electronic dictionaries, such as monolingual, bilingual, multilingual, bi-directional, and the like. An electronic dictionary typically comprises words in one or more languages and corresponding translations in one or more languages.

The purpose of an electronic dictionary is to translate meanings of words, that is, to explain a word (hereafter, "a word" means a word or a word group) by using a plurality of words with similar meanings. Therefore, an electronic dictionary naturally provides a wide range of information about words related to a specific concept.

Examples of electronic or machine-readable dictionaries and computer systems that make use of these dictionaries may be found in U.S. Patent Application Publication No. 2004/0153311 entitled "Building Concept Knowledge from Machine-Readable Dictionary," published Aug. 5, 2004, U.S. Patent Application Publication No. 2004/0148597 entitled "System for Optimizing Distribution of Information Employing a Universal Dictionary," published Jul. 29, 2004, and U.S. Patent Application Publication No. 2004/0148381 entitled "Dictionary Updating System, Updating Processing Server, Terminal, Control Method, Program and Recording Medium," published Jul. 29, 2004, all of which are hereby incorporated by reference.

While these electronic dictionaries provide a mechanism for associating meaning to terms used in an electronic document, they are tied to the particular computer system in which they are residing. That is, one computer system may have a different electronic dictionary from that of another computer system and, as a result, terms which may have dictionary entries in one electronic dictionary may not have entries in another electronic dictionary on another computer system. As a result, the problems of the user not understanding the terms used in an electronic document may persist because the user's electronic dictionary does not have the necessary entries to provide meaning to these terms.

In some implementations of electronic dictionaries, such as in U.S. Patent Application Publication No. 2004/0148597, a universal electronic dictionary is used with all computer systems such that every computer system has the same electronic dictionary. While this may address the problem of different computer systems having different electronic dictionaries, the terms that may be given meaning using the universal electronic dictionary are limited to only those that are present in every computer system's universal electronic dictionary. Thus, an author of an electronic document cannot generate a document using a term that is not supported in the universal electronic dictionary and expect to have every potential reader of the electronic document understand the term. In view of the above, it would be beneficial to have a system and method that provides an ability to provide an electronic dictionary entry for uncommon terms in an electronic document which ensures that all potential readers of the electronic document will have access to the electronic dictionary entry.

SUMMARY OF THE INVENTION

The present invention provides a system and method for providing a transient electronic dictionary that travels with an original electronic document. The system and method permit an author of an electronic document to generate a transient electronic dictionary that is either appended to the end of the electronic document file or is provided as a separate but associated transient electronic dictionary file. This transient electronic dictionary is linked with the original electronic document such that the transient electronic dictionary is transmitted along with the original electronic document when the original electronic document is distributed. Alternatively, a link to the transient electronic dictionary may be provided with the original electronic document such that the link is accessed when the original electronic document is accessed and the corresponding transient electronic dictionary is loaded for use with the representation of the original electronic document.

At a recipient computer system, when the original electronic document is accessed, the associated transient electronic dictionary is loaded by the word processing application. The loaded transient electronic dictionary is used to expand the permanent electronic dictionary present in the recipient computer system either temporarily or permanently. The word processing application may then resolve words in the original electronic document using the loaded transient electronic dictionary entries.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a flowchart outlining an exemplary operation for generating a transient document associated dictionary in accordance with one exemplary embodiment of the present invention.

DETAILED DESCRIPTION OF THE PREFERRED EMBODIMENT

As mentioned above, the present invention is directed to a system and method for providing a transient dictionary that travels with an original electronic document. For purposes of the present description, the term "electronic document" means any collection of data representing a form of information having textual content, by itself or in addition to other types of content including graphical content, audible content, and the like. An "electronic document" is stored as one or more files in a computer system and may be represented for use by a user of the computer system using one or more software applications present in the computer system.

Figure 1:
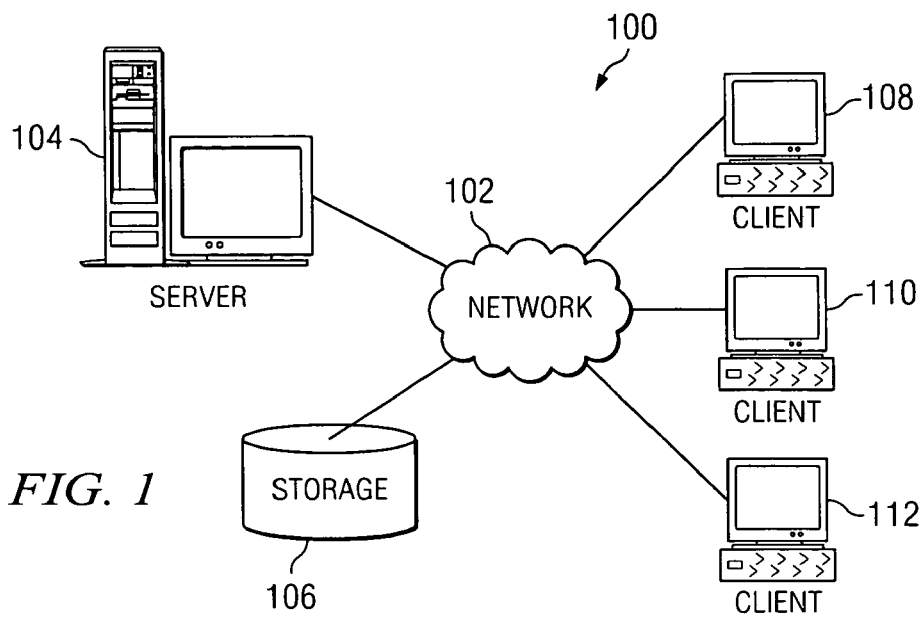
FIG. 1 is an exemplary diagram of a distributed data processing system in which exemplary aspects of the present invention may be implemented.
Figure 2:
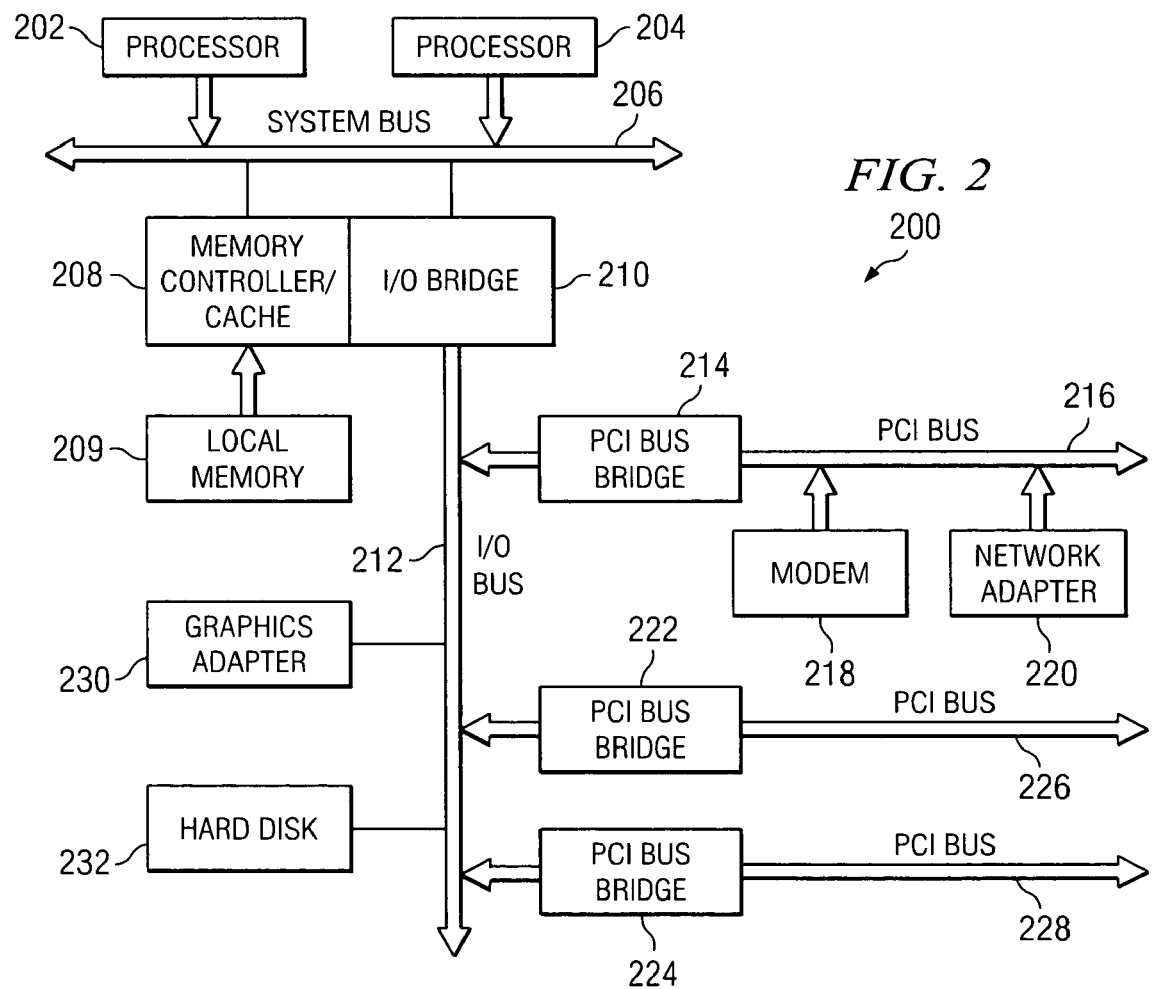
FIG. 2 is an exemplary diagram illustrating a server data processing device in which aspects of the present invention may be implemented.
Figure 3:
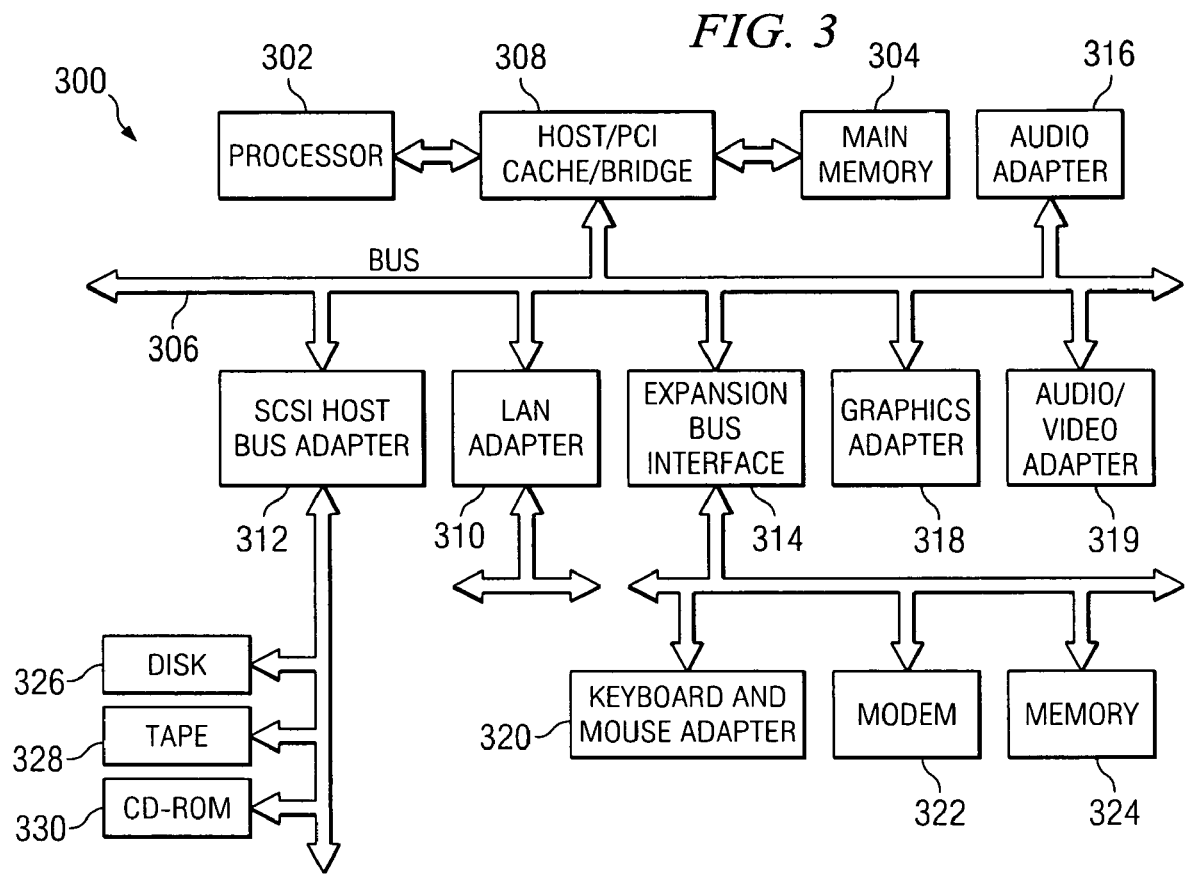
FIG. 3 is an exemplary diagram illustrating a client data processing device in which aspects of the present invention may be implemented.

Because the present invention operates on electronic documents that are meant to be distributed to other computing devices, the mechanisms of the present invention are especially well suited for use with a distributed data processing environment, such as a local area network, wide area network, the Internet, and the like. FIGS. 1-3 are provided as examples of the data processing environments and systems in which aspects of the present invention may be implemented. It should be appreciated that FIGS. 1-3 are only exemplary and are not intended to state or imply any limitation as to the types or configurations of data processing environments or systems in which the present invention may be implemented. Many modifications to the depicted data processing environments and systems may be made without departing from the spirit and scope of the present invention.

With reference now to the figures, FIG. 1 depicts a pictorial representation of a distributed data processing systems in which the present invention may be implemented. The distributed data processing system 100 is a network of computers in which the present invention may be implemented. The distributed data processing system 100 contains a network 102, which is the medium used to provide communications links between various devices and computers connected together within distributed data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. The distributed data processing system 100 may include additional servers, clients, and other devices not shown. In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With reference again to FIG. 1, when a user of a client device, such as client 108, generates an electronic document, the user may make use of terms, acronyms, or the like, which may not be standard terms, acronyms, etc. that are readily known to standard electronic dictionaries associated with word processing software. In such a case, the word processing software associated with the client device may highlight or otherwise identify these terms, acronyms, etc. (hereafter collectively referred to as "terms") as being unknown. For example, a graphical depiction, such as underlining, the use of a different color text, etc., may be used to identify unknown terms in an electronic document.

The user of the client device may then select these unknown terms and choose an option to provide an electronic dictionary definition for these unknown terms. Similarly, the user may also select other known terms in order to provide an alternative electronic dictionary definition for these known terms. The electronic dictionary definitions entered by the user are stored as part of a transient document associated dictionary that is stored in association with the original electronic document. The transient document associated dictionary may be stored as part of the original electronic document file, such as being appended to the end of the original electronic document data, or may be stored as a separate but linked file to the original electronic document file, for example. In an alternative embodiment, the transient document associated dictionary may be stored as a file in an accessible location of a computer system with a link, e.g., a hyperlink, to this location and file being added to the electronic document file or otherwise transmitted with the transmission of the original electronic document to a recipient computer system.

The original electronic document, and its associated transient document associated dictionary, or a link to the temporary document associated dictionary, may then be distributed to other client devices, such as to client devices 110 and 112. When the original electronic document is accessed by software resident on these other client devices 110 and 112, e.g., a word processing application on the client devices 110 and 112, the original electronic document is opened in a graphical user interface such that the users of the client devices 110 and 112 may view the original electronic document. In addition, the transient document associated dictionary is loaded, either directly from the appended or associated transient document associated dictionary file or by accessing the link to the transient document associated dictionary, by the software for use during access of the original electronic document. The transient document associated dictionary does not automatically alter the permanent electronic dictionaries present on the client devices 110 and 112 but is only used by the software while the original electronic document is being accessed. Thus, in this capacity, the transient document associated dictionary is temporary in nature and may be unloaded once the original electronic document is closed or is otherwise not being represented in the software of the client devices 110 and 112. An option may be provided to the users of the client devices 110 and 112 to add the dictionary definitions in the temporary document associated dictionary to their permanent electronic dictionaries, however this is not required for the functionality of the present invention. With such a functionality, the transient document associated dictionary may be made permanent by using the transient document associated dictionary to permanently expand the local permanent electronic dictionaries of the client devices 110 and 112.

Various functions within the software present on the client devices 110 and 112 are influenced by the loaded transient document associated dictionary. For example, similar recognition of unknown terms by the software on the client devices 110 and 112 may be influenced by the loaded transient document associated dictionary such that these terms are not indicated as being unknown when the original electronic document is displayed on the client devices 110 and 112. Moreover, these terms may be otherwise indicated as having dictionary definitions in the loaded transient document associated dictionary. That is, other highlighting, underlining, or the like, may be used to identify terms in an original electronic document that have dictionary definitions in an associated loaded transient document associated dictionary.

In addition, spell checker functionality of the software present on the client devices 110 and 112 may be influenced by the loaded transient document associated dictionary. That is, without the transient document associated dictionary being loaded by the software of the client devices 110 and 112, unknown terms might be identified as being misspelled by the spell checker functionality of the software. With the transient document associated dictionary loaded, the spell checker functionality is augmented such that, at least for the associated original electronic document, terms used in the transient document associated dictionary will not be shown as misspelled. Other functionality of the software in the client devices 110 and 112 may be augmented or otherwise influenced by the content of the loaded transient document associated dictionary without departing from the spirit and scope of the present invention.

Figure 4:
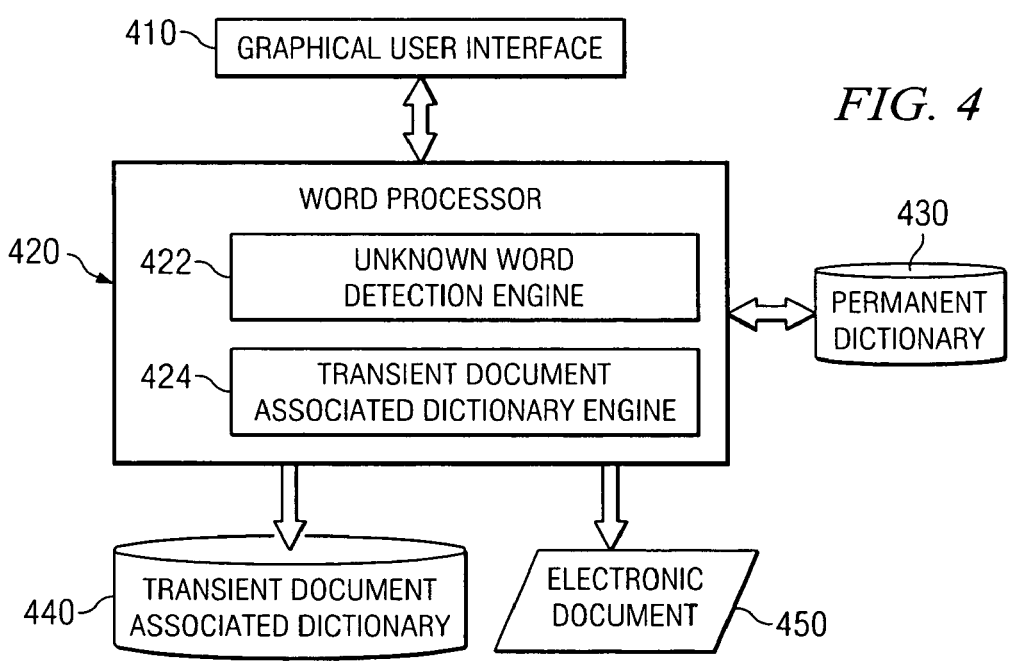
FIG. 4 is an exemplary diagram illustrating an operation for creating a transient document associated dictionary in accordance with one exemplary embodiment of the present invention.

FIG. 4 is an exemplary diagram illustrating an operation for creating a transient document associated dictionary in accordance with one exemplary embodiment of the present invention. As shown in FIG. 4, a user of a client device, such as client device 108, may make use of a graphical user interface 410 to provide input to a word processor 420 or other document generation software program. For purposes of this description, it will be assumed that the software application being used to generate and/or view an electronic document is a word processing application such as Lotus WordPro™ or Microsoft Word™.

The user may generate an original electronic document 450 using the functionality provided by the word processor 420 in a manner generally known in the art. For example, the user may type characters via a keyboard in order to have the data representative of these characters, the formatting of the document, and the like, stored as an original electronic document file 450. In addition, the word processor 420 is provided with an unknown word detection engine 422 and a transient document associated dictionary engine 424. The unknown word detection engine 422 may be integrated with other engines within the word processor 420, such as a spell checking engine or the like.

As the user provides textual content for the original electronic document 450, or as part of a post-processing step during original electronic document 450 generation, the unknown word detection engine 422 identifies terms in the original electronic document 450 that are not recognized as being part of the permanent dictionary 430. Those terms that are not recognized may then be highlighted or otherwise accentuated in a representation of the original electronic document to thereby indicate to the user that these terms are not recognized by the word processor 420. Alternatively, a user may select a functionality of the word processor 420 to be applied to the original electronic document 450 to identify unknown terms, e.g., a spell check functionality or a specific "unknown terms" functionality, that scans the content of the original electronic document 450 and identifies terms that are not recognized.

The user may select the identified "unknown terms," or may even select known terms, in order to provide an electronic dictionary definition for these terms. For example, by "right clicking" a mouse button, the user may be provided with a menu of possible functions to be performed on the unknown term. One of these options may be to "provide dictionary definition." By selecting this option, the user may be provided with an interface through which the user may add a dictionary definition for the unknown or known term. The dictionary definition may be in any form including phrase type definitions, lists of associated words, e.g., synonyms, or the like.

When the user has completed entry of the dictionary definition for the unknown term, the user's input is stored as part of a transient document associated dictionary 440 that is linked to the original electronic document 450 and/or a local permanent dictionary 430, depending on the selection made by the user. This transient document associated dictionary 440 may take the form of a table type data structure in which terms in the original electronic document are associated with corresponding dictionary definitions, for example. The temporary document associated dictionary 440 may be stored as part of the data file of the original electronic document, such as being appended to the end of the file, may be stored as a separate but linked file, or may be stored as a file in an accessible location of a computer system that is accessible by way of a hyperlink or other reference provided with the original electronic document, for example.

As mentioned above, the ability to provide dictionary definitions for terms used in the original electronic document is not limited to only those terms that are identified as being unknown terms. Rather, the ability to provide dictionary definitions for terms in the original electronic document extends to any term in the original electronic document that is selectable by the user. By providing this ability for any term in the original electronic document, the user is given the ability to provide a supplemental or different dictionary definition for a term than may be included in a permanent dictionary 430. This supplemental or different dictionary definition may be used to either complement or supersede existing dictionary definitions in a local permanent dictionary. As a result, the user is permitted to be his/her own lexicographer with regard to any term used in the original electronic document.

Having generated an original electronic document 450 and a transient document associated dictionary 440, the original electronic document 450 may be distributed to other computing devices, e.g., other client computers or server computers. In distributing the original electronic document 450, because the transient document associated dictionary 440 is linked to this original electronic document 450, the transient document associated dictionary 440 is also distributed to these other computing devices. In this way, when the other computing devices are used to access the content of the original electronic document 450, the transient document associated dictionary 440 is loaded by the computing devices and used to influence the way in which the computing device represents the original electronic document 450. Thus, the transient document associated dictionary 440 travels with the original electronic document 450 wherever it is distributed.

Figure 5:
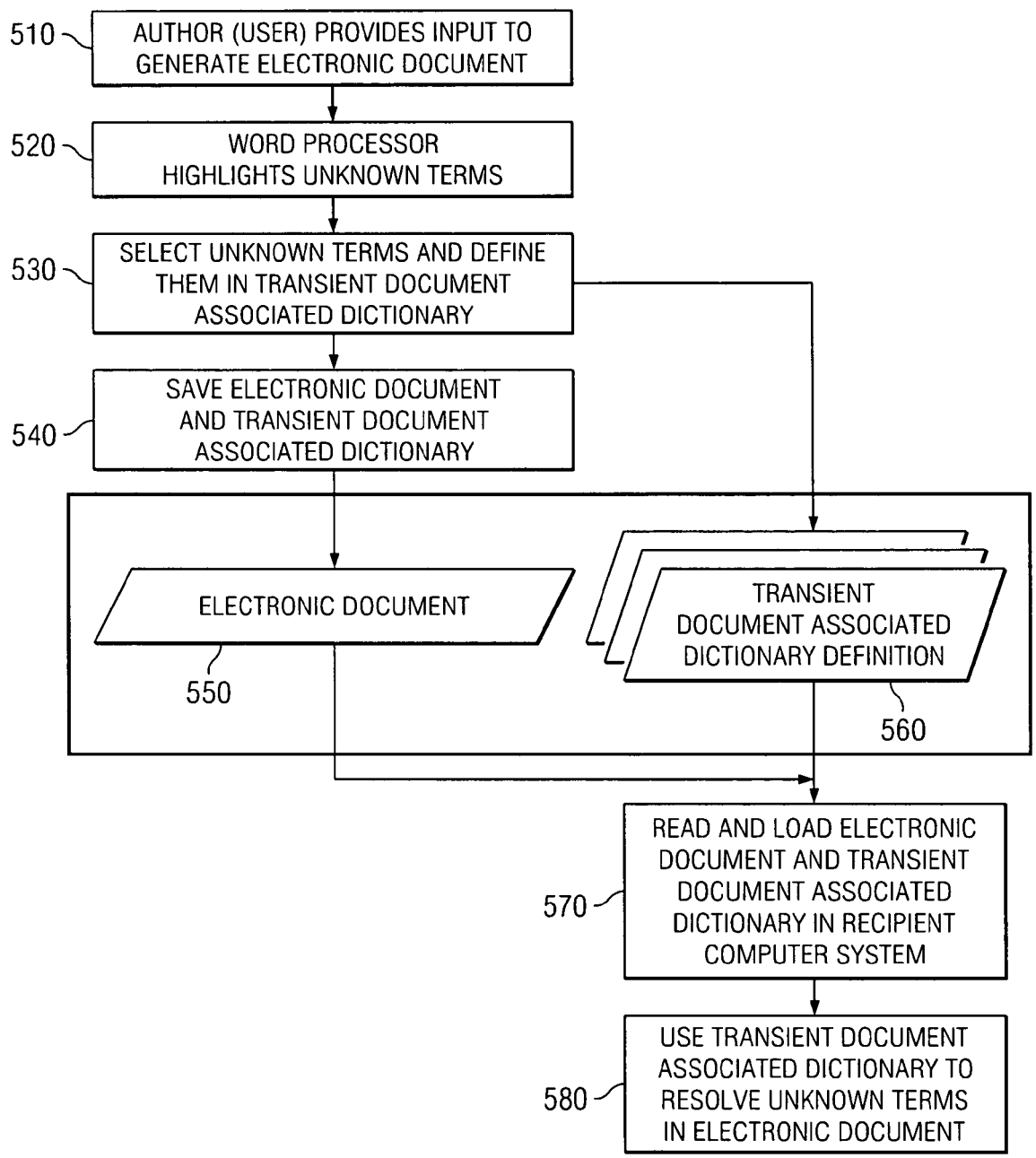
FIG. 5 is an exemplary diagram illustrating an operation for creating and transmitting a transient document associated dictionary along with an original electronic document in accordance with one exemplary embodiment of the present invention.

FIG. 5 is an exemplary diagram illustrating an operation for creating and transmitting a transient document associated dictionary along with an original electronic document in accordance with one exemplary embodiment of the present invention. As shown in FIG. 5, an author of a new electronic document 550, i.e. a user of a computer system, provides input (510) to a word processor which highlights unknown terms in the electronic document (520). The author may then select the unknown terms and declare the unknown terms to be defined by providing a dictionary definition in a transient document associated dictionary 560 (530). The author may save this electronic document 550 and the transient document associated dictionary 560 for later distribution (540).

Thereafter, the electronic document 550 and its transient document associated dictionary 560 may be distributed to another computer system where they are read and loaded by software on the computer system (570). The recipient computer system then uses the transient document associated dictionary 560 to resolve the terms in the electronic document 550 that are not known to the permanent dictionary present in the recipient computer system (580). As mentioned above, resolving the unknown terms using the transient document associated dictionary 560 may include highlighting those terms in the electronic document 550 having definitions in the transient document associated dictionary 560, providing an option to the user of the recipient computer system to add the definitions in the transient document associated dictionary 560 to a permanent dictionary present in the recipient computer system, and the like. In addition, other functionality of software applications that load the transient document associated dictionary 560 may be modified based on the content of the transient document associated dictionary 560, e.g., spell checking functionality. This modification may be temporary in nature and may last for the time period that the original electronic document 550 is being accessed, or may be more permanent in nature by permanently expanding a local permanent dictionary based on the content of the transient document associated dictionary 560.

Figure 6A:
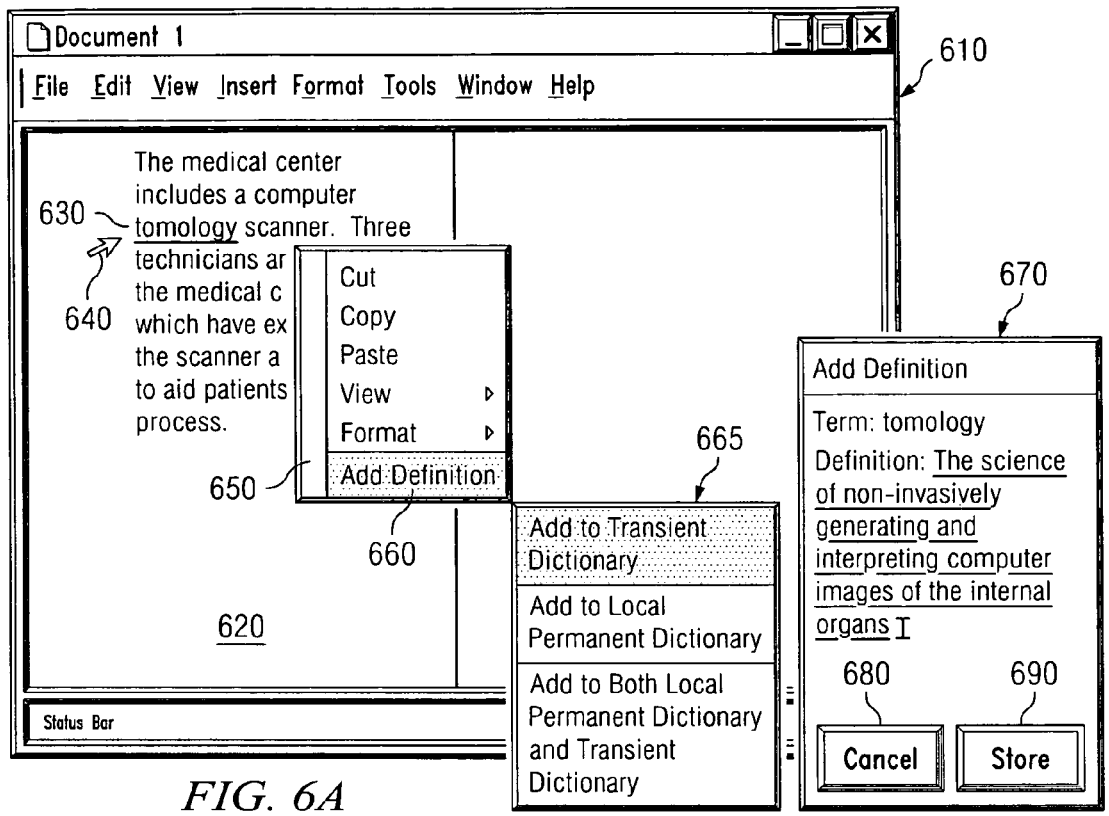
FIG. 6A is an exemplary diagram illustrating a graphical user interface for generating a transient document associated dictionary in accordance with one exemplary embodiment of the present invention.

FIG. 6A is an exemplary diagram illustrating a graphical user interface for generating a transient document associated dictionary in accordance with one exemplary embodiment of the present invention. As shown in FIG. 6A, in a graphical user interface 610 of a software program, e.g., a word processing program, the textual content of an original electronic document may be displayed 620 for viewing by a user of the graphical user interface 610. Unknown terms 630 in the original electronic document may be identified during creation of the original electronic document, or during a post-processing scan of the textual content, and highlighted or otherwise accentuated in the display 620.

A user may use a pointing device or other input device to maneuver a cursor 640 to select the unknown terms 630, or any other selectable term, in the original electronic document. By placing the cursor 640 over a term and pressing an appropriate button, e.g., "right clicking" a mouse button, a menu 650 of possible functions may be provided. In this menu 650 is an option 660 to provide a dictionary definition for the selected term. By selecting this option 660, an additional sub-menu 665 may be provided for specifying which dictionary, e.g., the transient document associated dictionary, the local permanent dictionary, or both, to which a user entered definition for the term is to be added. Upon selection of the appropriate dictionary to which the definition is to be added, an interface 670 is provided for entry of the dictionary definition. The interface 670 provides a graphical user interface element 680 for canceling the entry of the dictionary definition and an element 690 for storing the entered dictionary definition in a transient document associated dictionary. Thereafter, once a definition for the term is present in the transient document associated dictionary, the highlighting or other accentuation of the unknown term may be removed to indicate that the term is now defined and spelled correctly.

Figure 6B:
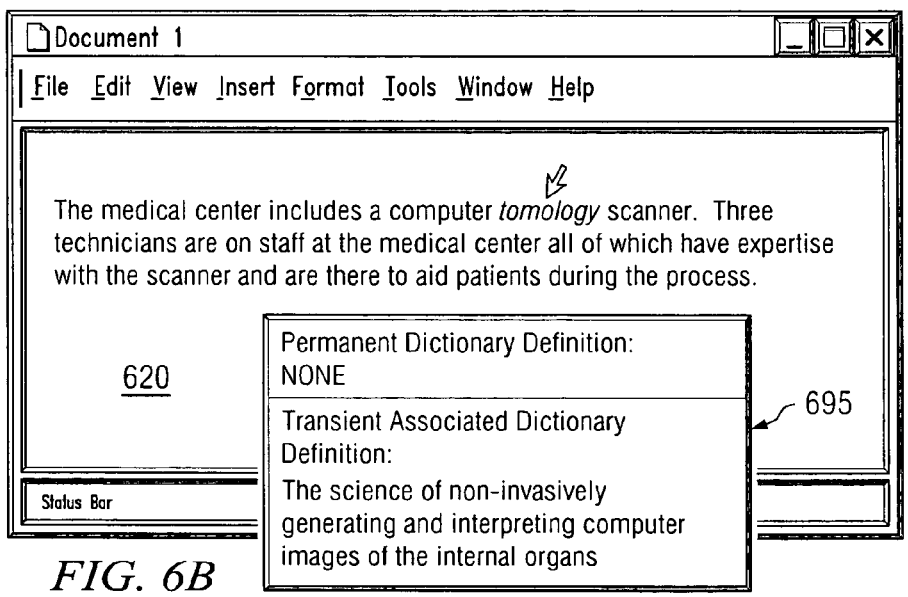
FIG. 6B is an exemplary diagram illustrating a graphical user interface in which a term that is defined in a transient document associated dictionary is highlighted and has its associated definitions displayed, in accordance with one exemplary embodiment of the present invention.

At a recipient computing device, the original document and its associated transient document associated dictionary are received, either directly or the transient document associated dictionary may be accessed by way of a hyperlink or other reference, and the original document 620 is displayed as illustrated in FIG. 6B. In addition, the transient document associated dictionary is loaded by the recipient computing device to thereby augment the local permanent dictionary. The display of the original document 620 may include highlighting of various types, e.g., bold italics as illustrated, for identifying those terms in the original document 620 for which a definition is provided in the transient document associated dictionary that is associated with the original document. The user may select the highlighted terms in the original document to thereby open an interface 695 for displaying the dictionary definitions associated with those highlighted terms. The display of the dictionary definitions may include the definitions in the local permanent dictionary, the definitions in the transient document associated dictionary, or both. In addition, the graphical user interface may provide options for the user to turn on or off the highlighting of terms having dictionary definitions provided in the transient document associated dictionary, based on the desires of the user.

Figure 8:
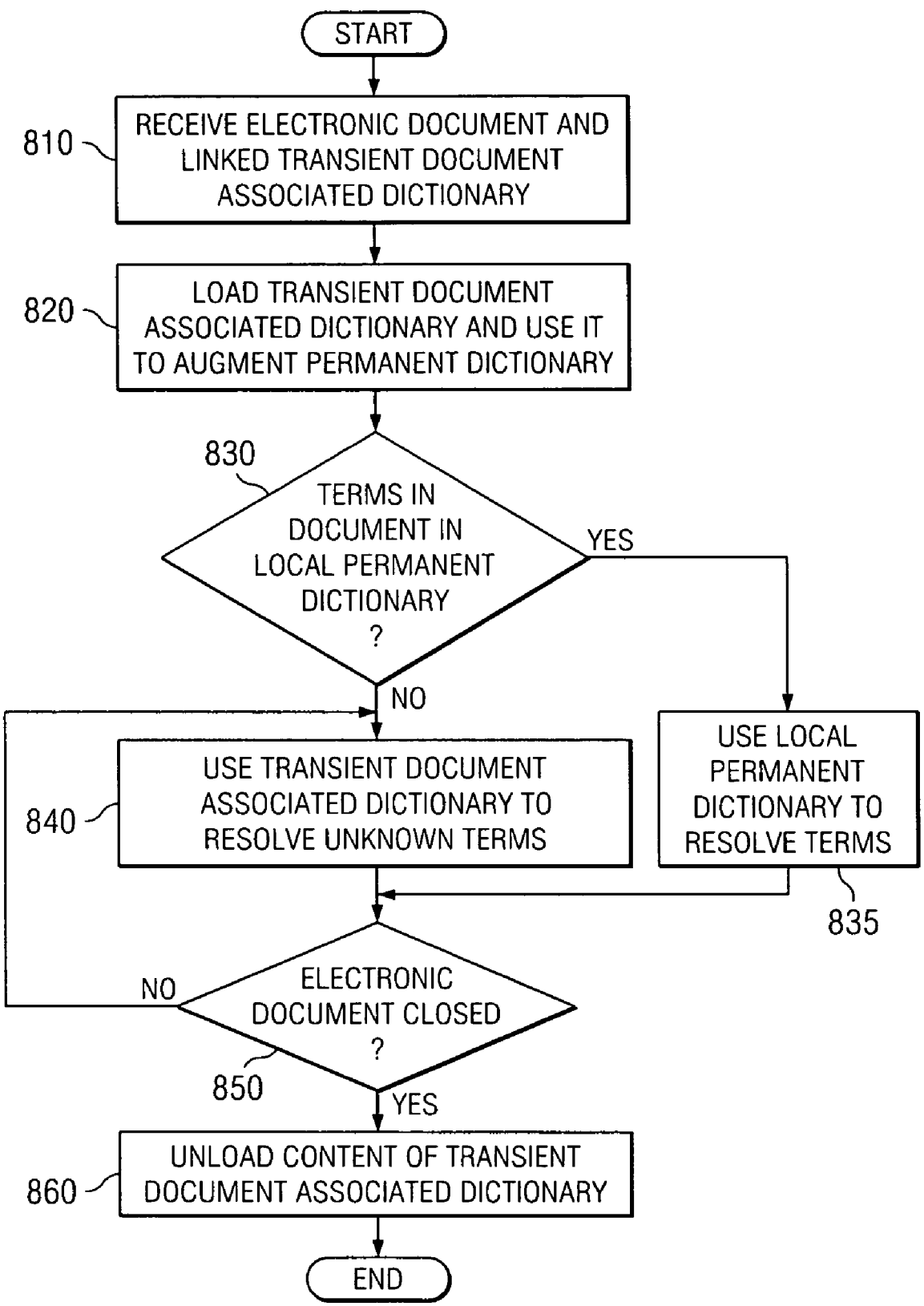
FIG. 8 is a flowchart outlining an exemplary operation for loading and utilizing a received transient document associated dictionary in accordance with one exemplary embodiment of the present invention.

FIGS. 7 and 8 provide flowcharts outlining exemplary operations of exemplary embodiments of the present invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 7 is a flowchart outlining an exemplary operation for generating a transient document associated dictionary in accordance with one exemplary embodiment of the present invention. As shown in FIG. 7, the operation starts by receiving input from a user providing textual content for an electronic document (step 710). A determination is made as to whether the textual content includes an unrecognizable term (step 720). If not, the operation continues to step 780. If the textual content includes an unknown term, the unknown term is highlighted (step 730).

A determination is made as to whether a term in the textual content of the electronic document is selected for entry of a dictionary definition (step 740). If not, the operation continues to step 780. If a term in the textual content is selected for entry of a dictionary definition, a user interface for entry of the dictionary definition is provided (step 750). Input is received from the user for providing a dictionary definition (step 760). The input is then stored as part of a transient document associated dictionary that is linked to the electronic document and/or the local permanent dictionary, depending on the option selected by the user (step 770).

A determination is then made as to whether entry of textual content for the electronic document has ended (step 780). If not, the operation returns to step 710. If textual content entry has ended, the electronic document and its associated transient document associated dictionary are stored for later use (step 790). The operation then terminates.

FIG. 8 is a flowchart outlining an exemplary operation for loading and utilizing a received temporary document associated dictionary in accordance with one exemplary embodiment of the present invention. As shown in FIG. 8, the operation starts by receiving an electronic document having a linked transient document associated dictionary (step 810). The content of the transient document associated dictionary is loaded and used to augment a local permanent dictionary temporarily during accessing of the content of the linked electronic document (step 820). A determination is made as to whether terms in the document are in the local permanent dictionary (step 830). If the terms are in the local permanent dictionary, then the local permanent dictionary is used to resolve terms in the document (step 835). If there are terms in the document that are not in the local permanent dictionary, then the transient document associated dictionary content is used to resolve those terms in the electronic document when representing the electronic document on the recipient computer system (step 840). In addition, if the transient document associated dictionary is intended to supersede the local permanent dictionary, such as when an alternative definition for a known term is provided, then the transient document associated dictionary may be used to resolve terms in the electronic document when representing the electronic document on the recipient computer system. Alternatively, if the transient document associated dictionary is intended to complement definitions in the local permanent dictionary, then both the local permanent dictionary and the transient document associated dictionary may be used to collaboratively provide resolution of terms in the original electronic document. In addition, the user of the recipient computer system may access the definitions through an option provided via a functionality of the software running on the recipient computer system, as illustrated in FIG. 6B, for example.

A determination is made as to whether the electronic document is closed (step 850). If not, the operation returns to step 830 where the electronic document continues to be represented on the recipient computer system for use by a user. If the electronic document is closed, then the content of the transient document associated dictionary is unloaded from the software running on the recipient computer system (step 860). The operation then terminates.

Thus, the present invention provides a mechanism by which a transient document associated dictionary may be generated and linked to an electronic document. This transient document associated dictionary travels with the electronic document and may be temporarily or permanently loaded by recipient computer systems in order to resolve unknown or known terms in the electronic document using software present on the recipient computer systems. As a result, the mechanism of the present invention provides a way for permanent dictionaries on computer systems to be temporarily or permanently expanded for terminology used in a particular electronic document.

As discussed above, while the preferred embodiments of the present invention are primarily directed to defining unknown terms, the present invention is not limited to such. Rather, a user may select even known terms using the mechanisms of the present invention and provide an alternative definition which may be included in the transient document associated dictionary and optionally in the permanent dictionary of the computing device. Thus, in instances above where an "unknown term" is selected and defined, the present invention may also be used to select and define "known terms" such that alternative definitions for these terms are made possible. These alternative definitions may complement or supersede definitions of the same term in local permanent dictionaries when representing the associated electronic document.

It should further be noted that the exemplary embodiments of the present invention described above are described in terms of a single transient document associated dictionary being linked to an original electronic document. However, the present invention is not limited to such. Rather, multiple transient document associated dictionaries may be linked to an original electronic document without departing from the spirit and scope of the present invention. For example, in one exemplary embodiment of the present invention, the same or different users may provide one or more transient document associated dictionaries that are to travel with the electronic document. Thus, for example, a first recipient of the electronic document may receive the electronic document and a first transient document associated dictionary, determine that additional terms need to be defined in the document prior to forwarding the document to another recipient, and provide a second transient document associated dictionary that is similarly linked to the electronic document. Other mechanisms for associating more than one transient document associated dictionary with an electronic document may be used without departing from the spirit and scope of the present invention.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating an electronic document, comprising:
   receiving textual content of the electronic document;
   receiving a selection of a term in the textual content;
   receiving a dictionary definition of the selected term;
   storing the dictionary definition in a transient document associated electronic dictionary that is linked to the electronic document;
   storing the electronic document and the transient document associated electronic dictionary in association with one another wherein, in response to electronic distribution of the electronic document to one or more recipient computer systems, the transient document associated electronic dictionary is automatically distributed along with the electronic document, by virtue of the electronic document and transient document associated electronic dictionary being stored in association with one another, to the one or more recipient computer systems;

receiving the electronic document and the associated transient document associated dictionary at a recipient computing device;

loading the transient document associated dictionary to augment a local permanent dictionary of the recipient computing device;

outputting a request, at the recipient computing device, requesting that a user indicate whether the transient document associated dictionary is to augment the local permanent dictionary of the recipient computing device permanently or temporarily;

permanently adding definitions from the transient document associated dictionary to the local permanent dictionary of the recipient computing device in response to the user indicating that the transient document associated dictionary is to augment the local permanent dictionary permanently; and preventing the definitions from the transient document associated dictionary from permanently being added to the local permanent dictionary of the recipient computing device in response to the user indicating that the transient document associated dictionary is to augment the local permanent dictionary temporarily such that the definitions from the transient document associated dictionary are only used with the associated electronic document and not with other electronic documents.

2. The method of claim 1, further comprising:
identifying one or more terms in the textual content for the electronic document; and
accentuating, in a display of the electronic document, the one or more terms in the textual content for the electronic document, wherein the one or more terms are terms that are either not defined in a local permanent dictionary or are defined in both the local permanent dictionary and the transient document associated electronic dictionary.

3. The method of claim 1, further comprising:
displaying, in response to selection of a term in the textual content, an interface for selecting one or more of the transient document associated dictionary and a local permanent dictionary, in which a definition of the selected term is to be edited.

4. The method of claim 1, further comprising:
displaying, in response to selection of a term in the textual content, an interface for entry of a dictionary definition for the selected term.

5. The method of claim 1, further comprising:
using definitions in the transient document associated dictionary to resolve terms in the electronic document.

6. The method of claim 1, further comprising:
displaying the electronic document on a display associated with the recipient computing device; and
accentuating terms in the displayed electronic document having dictionary definitions in the transient document associated dictionary associated with the electronic document.

7. The method of claim 6, further comprising:
receiving a selection of an accentuated term in the displayed electronic document; and
displaying both a local permanent dictionary definition associated with the selected accentuated term and a transient document associated dictionary definition associated with the selected accentuated term in response to selection of the accentuated term in the displayed electronic document, wherein the local permanent dictionary definition and the transient document associated dictionary definition are displayed separately and are identified in the display as being retrieved from the local permanent dictionary and the transient document associated dictionary, respectively.

8. The method of claim 2, further comprising:
removing accentuation of the selected term in the display of the electronic document in response to receiving the dictionary definition for the selected term.

9. The method of claim 1, wherein the transient document associated dictionary is stored in an accessible location of a computing system, and wherein the transient document associated dictionary is distributed as a link to the transient document associated dictionary in the accessible location.

10. The method of claim 1, wherein the transient document associated dictionary only temporarily augments the local permanent dictionary of the recipient computing device while the electronic document associated with the transient document associated dictionary is being accessed by the recipient computing device.

* * * * *

UNITED STATES PATENT AND TRADEMARK OFFICE
CERTIFICATE OF CORRECTION

PATENT NO. : 7,627,816 B2 Page 1 of 1
APPLICATION NO. : 11/103784
DATED : December 1, 2009
INVENTOR(S) : Bhogal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Second Day of November, 2010

David J. Kappos
*Director of the United States Patent and Trademark Office*